United States Patent [19]
Sullivan

[11] Patent Number: 6,146,005
[45] Date of Patent: Nov. 14, 2000

[54] FLEXIBLE ADJUSTER FOR HEADLAMPS

[75] Inventor: Timothy P. Sullivan, Clinton, Ohio

[73] Assignee: Trans Technology Enginered Components LLC, Brunswick, Ohio

[21] Appl. No.: 09/311,331

[22] Filed: May 13, 1999

[51] Int. Cl.[7] .................................................. F21V 29/00
[52] U.S. Cl. ........................ 362/523; 362/306; 362/484; 362/66
[58] Field of Search ................................ 464/147, 77, 57; 362/306, 484, 66

[56] References Cited

U.S. PATENT DOCUMENTS

| | | | |
|---|---|---|---|
| 4,345,307 | 8/1982 | Mayer et al. | 362/306 |
| 4,665,469 | 5/1987 | Furfari et al. | 362/66 |
| 4,709,306 | 11/1987 | Harris et al. | 362/68 |
| 4,796,494 | 1/1989 | Eckenrode et al. | 81/484 |
| 4,893,219 | 1/1990 | Lisak | 362/66 |
| 5,023,759 | 6/1991 | Eckenrode | 362/66 |
| 5,045,987 | 9/1991 | Hebert | 362/421 |
| 5,063,481 | 11/1991 | Martin | 362/61 |
| 5,115,382 | 5/1992 | Smith | 362/105 |
| 5,161,877 | 11/1992 | Wright et al. | 362/66 |
| 5,165,775 | 11/1992 | Lisak et al. | 362/66 |
| 5,321,590 | 6/1994 | Wu | 362/66 |
| 5,398,173 | 3/1995 | Ellenberger | 362/66 |
| 5,508,896 | 4/1996 | Suehiro et al. | 362/66 |
| 5,642,935 | 7/1997 | Schmitt | 362/294 |
| 5,775,794 | 7/1998 | Schmitt | 362/66 |
| 5,833,346 | 11/1998 | Denley | 362/66 |

*Primary Examiner*—Sandra O'Shea
*Assistant Examiner*—Anabel M Ton
*Attorney, Agent, or Firm*—Vytas R. Matas

[57] ABSTRACT

A flexible headlamp position adjusting assembly 10 employs flexible cable 14, 14' connected to a drive member 12 and the adjusting member 16. Adjusting member 16 is slidably received within housing 18 for movement and adjustment of a movable frame 26 of a headlamp. Advantageously, drive member 12 may be situated remotely from the moveable frame and/or housing 18 to allow drive member 12 to be positioned in an accessible area for control of adjusting member 16.

14 Claims, 1 Drawing Sheet

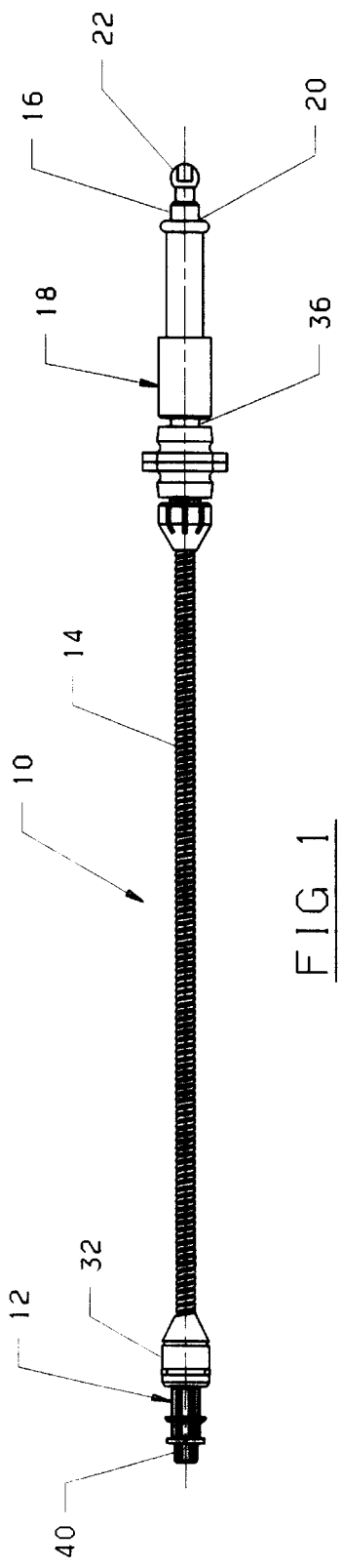
FIG 1
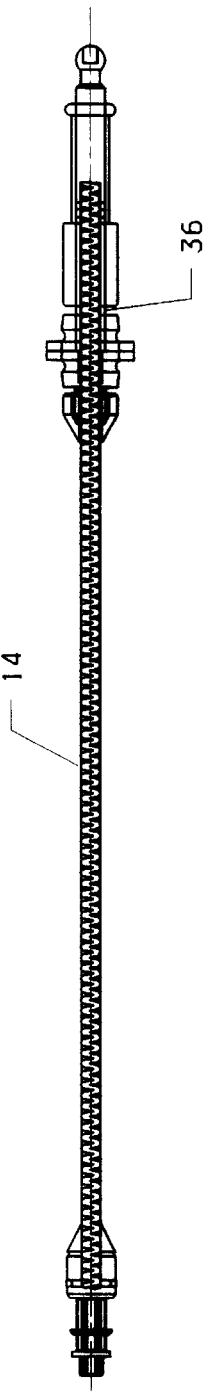
FIG 2
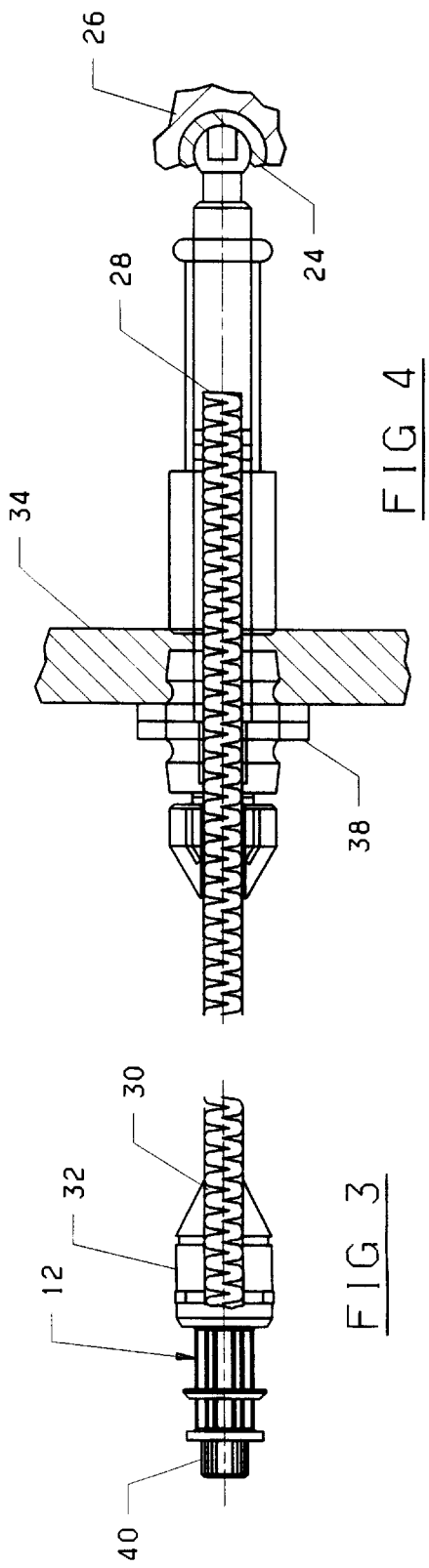
FIG 4
FIG 3

FLEXIBLE ADJUSTER FOR HEADLAMPS

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

The present invention relates in general to a vehicle headlamp adjuster, and more specifically to a flexible adjuster for headlamps.

2. Description of the Related Art

Vehicular headlights have for many years been mounted on moveable frames to enable periodic adjustment of their position which is apt to change due to vibration, road conditions, and the like. Ideally, the headlights illuminate the road ahead in a suitable manner without focusing directly on oncoming vehicles which could possibly blind the opposing driver.

The headlight frame position has commonly been adjustable, for example, by means of straight screws threadingly engaged with a fixed frame. Upon rotation, the headlight and its frame moves upwardly and/or downwardly, or to the right and left as required. Lately, due to more complex designs and more difficult accessibility, gear box assemblies have been employed. These devices use rotatable input drive members with an output adjusting screw that is either horizontally or angularly oriented with respect to the drive member.

One such example is disclosed and described in U.S. Pat. No. 4,665,469 which is assigned to the Assignee of the present invention, and hereby incorporated by reference.

Still another example is described in U.S. Pat. No. 4,796,494 which is also assigned to the Assignee of the present invention, and hereby incorporated by reference.

A further example of a headlight adjustment assembly is described in U.S. Pat. No. 5,023,759 also assigned to the Assignee of the present invention, and hereby incorporated by reference.

Other examples of gearbox assemblies are described in U.S. Pat. Nos. 4,893,219; 5,165,775; 5,398,173; 5,161,877; 5,775,794; 5,833,346; and 5,508,896.

Other patents of interest that describe pivot assemblies for vehicle headlight position adjustment assemblies include U.S. Pat. Nos. 5,063,481 and 5,045,987.

There is even more space constraints in the headlamp area of some new models of vehicles. As a result, it has become difficult to employ these prior art headlight adjusters.

There still exists a need for a flexible headlamp adjuster which allows adjustment of a vehicle headlamp position even in difficult to access areas. Preferably, such an adjuster employs a flexible vehicle drive member that is located in an accessible location and still functions to make the necessary adjustments to an adjusting member for positioning the vehicle headlamp.

BRIEF SUMMARY OF THE INVENTION

The present invention is directed to solving the aforementioned problems as well as others by providing a flexible headlamp position adjusting assembly. Advantageously, the present invention provides a flexible cable that connects one end of the adjusting member with the drive member to allow rotation of the drive member to advance or retract the adjusting member from the housing. In the preferred embodiment, the flexible cable is threadingly engaged within a bore in the housing and is secured thereby. The cable in conjunction with the drive member provides controlled movement of the adjusting member from a remote accessible location.

Accordingly, an object of the present invention is to provide a flexible vehicle headlamp position adjusting assembly.

Another object of the present invention is to provide a method for adjusting a difficult to access headlamp.

Still another object of the present invention is to provide a pliable adjuster for headlamps.

Still another object of the present invention is to provide an improved vehicle headlamp position adjusting assembly which is simple in design, yet rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is described and illustrated.

BRIEF DESCRIPTION OF THE DRAWINGS

FIG. 1 is a side elevation view of the preferred embodiment according to the present invention;

FIG. 2 is a side elevation view with portions removed of another embodiment of the present invention;

FIG. 3 is a side elevation view with a portion removed to illustrate the connection of the cable to the drive member; and FIG. 4 is a side elevation view with portions removed to illustrate the connection of the cable through the housing to the adjusting member as positioned within a fixed frame and moveable frame such as a headlamp reflector or headlamp itself of a vehicle.

DETAILED DESCRIPTION OF THE INVENTION

Referring to the figures, where like numerals designate like or similar features throughout the several views, and first in particular to FIG. 1, there is shown a vehicle headlamp position adjusting assembly generally designated 10 according to the present invention. The assembly includes the drive member 12, cable 14, adjusting member 16, and a housing 18. Preferably, housing 18 has a substantially tubular construction with a bore 20 therethrough.

Adjusting member 16 is situated within bore 20 of housing 18 and has one end 22 preferably shaped spherically to interlock with a yoke 24, in a ball and socket arrangement, attached to a moveable frame 26 of a headlamp. The term "moveable frame" as employed herein is intended to include without limitation a headlamp reflector, a headlamp itself, or a frame that the headlamp is attached to. Moveable frame 26 and yoke 24 are structures well known in the art. Adjusting member 16 is connected at its other end to a cable 14 which is preferably flexible that connects to a drive member 12. Cable 14 preferably is a steel wire cable as depicted in FIG.

1 which includes a wire wrap. An alternative embodiment includes a coiled spring shown as 14' in FIG. 2. Preferably, coiled spring 14' would have some stiffness yet remain flexible for this type of application. Alternative embodiments may even include fiber reinforced polymer, plastic material, or a cord which functions in the manner described herein. Cable 14 is connected to adjusting member 16 by inserting the cable 14 into an opening 28 that extends axially into adjusting member 16. In a similar manner, cable 14 is connected to the drive member 12 by inserting cable 14 into an opening 30 in an enlarged portion 32 of drive member 12. Of course, cable 14, 14' may be secured to adjusting member 16, or drive member 12 by any suitable means including without limitation a threading engagement, molding or forming the member over the end of the cable, welding, an adhesive or the like.

Portion 32 is preferably constructed to be received within a mating receptacle known in the art which is located in an accessible area which may be remote from the headlamp. The length of cable 14, 14' is variable and may be as long or as short as required for placement of drive member 12 in an accessible area. Advantageously, cable 14 still allows for advancement or retraction of the adjusting member 16 in or out from housing 18 simply by means of rotating drive member 12. In the preferred embodiment, the distal end 40 of drive member 12 includes a six-lobed external protrusion constructed for engagement with a corresponding socket or similar tool to facilitate rotation of the drive member. Of course, the distal end 40 may be hexagonal or square to allow engagement with a tool, or end 40 may be formed like a knob or thumb screw to be turned by hand.

Housing 18 is constructed for mounting to a fixed frame 34 which usually contains the moveable headlamp therein. Groove 36 meshes with the corresponding opening and fixed frame 34 in FIG. 4. Flange 38 facilitates support of housing 18 within fixed frame 34 to secure the housing 18 therein. The sides of groove 36 may be shaped to slidingly engage frame 34 if desired.

Preferably, adjusting member 16, housing 18, and drive member 12 may be constructed of a plastic material such as a reinforced nylon material. Preferably cable 14 is a braided metal cable which includes a wire wrap surrounding the braided cable as best seen in FIG. 1. The wire wrap threadingly engages bore 20 of housing 18 and allows controlled movement of member 16 therethrough. Simple rotation of drive member 12 moves adjusting member 16 for adjustment of the movable frame 26 such as a headlamp reflector or headlamp itself.

While specific embodiments of the invention have been shown and described in detail to illustrate the application of the principles of the invention, it will be understood that the invention may be embodied otherwise without departing from such principles.

I claim:

1. A vehicle headlamp position adjusting assembly, comprising:
   a housing having a bore therethrough and being constructed to mount to a frame on a vehicle;
   an adjusting member slidably received within the bore of said housing, said adjusting member having a first and a second end with said first end being constructed to engage a movable frame; and
   a drive member operable to axially move said adjusting member from said housing, said drive member having a first and a second end, said second end of said drive member being connected to said second end of said adjusting member with a cable, said cable being secured within the bore of said housing for controlling movement of said adjusting member.

2. A vehicle headlamp position adjusting assembly as recited in claim 1, wherein said cable comprises a wire wrap that threadably engages the bore of said housing.

3. A vehicle headlamp position adjusting assembly as recited in claim 2, wherein said first end of said drive member comprises a six-lobed external protrusion.

4. A vehicle headlamp position adjusting assembly as recited in claim 2, wherein said housing further comprises releasable means for securing said housing to a fixed frame on a vehicle for enabling said adjusting member to move the moveable frame in response to rotation of the drive member.

5. A vehicle headlamp position adjusting assembly as recited in claim 4, wherein said drive member comprises means for securing said drive member to a frame on a vehicle and allow for rotation of said drive member in opposite directions to move said adjusting member responsive thereto.

6. A vehicle headlamp position adjusting assembly as recited in claim 1 wherein said housing, said adjusting member, and said drive member comprise a plastic material and said cable comprises metal.

7. A vehicle headlamp position adjusting assembly as recited in claim 4, wherein said housing comprises a substantially tubular body, and said securing means comprises a groove in said body adapted for engagement with a corresponding opening in the fixed frame.

8. A vehicle headlamp position adjusting assembly as recited in claim 1, wherein said cable is flexible.

9. A vehicle headlamp position adjusting assembly as recited in claim 8, wherein said flexible cable threadingly engages said adjusting member at one end and said drive member at the other end.

10. A vehicle headlamp position adjusting assembly as recited in claim 8, wherein said flexible cable is secured within an opening at the second end of said adjusting member and is secured within an opening at the second end of said drive member.

11. A method for adjusting a difficult to access headlamp, comprises the steps of:
    providing a housing with a bore therethrough,
    an adjusting member through the bore of the housing;
    attaching a flexible cable to one end of the adjusting member and to one end of a drive member, the flexible cable being secured within the housing yet allowing controlled axial movement of the adjusting member therein;
    mounting the assembled device within an opening in a frame containing an adjustable headlamp;
    engaging the adjustable headlamp with a distal end of the adjusting member;
    situating the drive member in an accessible location of a vehicle having a difficult to access adjustable headlamp; and
    adjusting the headlamp with the drive member through use of the flexible cable from the accessible location.

12. A method as recited in claim 11, further comprising the step of wrapping a wire around the flexible cable prior to the attaching step.

13. A method as recited in claim 12, further comprising the step of forming the adjusting member, housing, and drive member from a plastic material prior to the providing steps.

14. A method as recited in claim 13, wherein the attaching step further comprises the step of threadably engaging the flexible cable in the bore of the housing.

* * * * *